United States Patent [19]

Buckholtz et al.

[11] Patent Number: 5,393,503
[45] Date of Patent: Feb. 28, 1995

[54] PROCESS FOR MAKING CHROMIC ACID

[75] Inventors: Harry F. Buckholtz, Lewiston; Daniel J. Jaszka, Tonawanda, both of N.Y.

[73] Assignee: Occidental Chemical Corporation, Niagara Falls, N.Y.

[21] Appl. No.: 756,748

[22] Filed: Sep. 9, 1991

[51] Int. Cl.$^6$ ............... C01G 37/00; C01G 37/14; C01B 7/01; C01B 17/96

[52] U.S. Cl. .................... 423/55; 423/57; 423/487; 423/544; 423/596; 423/597; 210/913

[58] Field of Search ........... 423/55, 57, 487, 499, 423/544, 531, 596, 597, 607, DIG. 2; 204/129, 128, 98; 210/913

[56] References Cited

U.S. PATENT DOCUMENTS

| | | | |
|---|---|---|---|
| 2,034,256 | 3/1936 | Vetter | 423/607 |
| 2,430,261 | 11/1947 | Udy | 423/595 |
| 2,444,256 | 6/1948 | Hill | 423/487 |
| 2,531,137 | 11/1950 | Laubi et al. | 423/499 |
| 2,967,807 | 1/1961 | Osborne et al. | 204/129 |
| 2,993,756 | 7/1961 | Marlatt et al. | 423/607 |
| 3,790,456 | 2/1974 | Bruen et al. | 204/61 |
| 3,896,209 | 7/1975 | Fournier et al. | 423/607 |
| 4,045,295 | 8/1977 | Schafer et al. | 423/531 |
| 4,045,340 | 8/1977 | Perrone | 423/607 |
| 4,891,206 | 1/1990 | Kulling et al. | 423/531 |
| 4,952,387 | 8/1990 | Lailach et al. | 423/531 |

FOREIGN PATENT DOCUMENTS 485974 9/1975 U.S.S.R. .............. 423/596

*Primary Examiner*—Steven Bos
*Attorney, Agent, or Firm*—Wayne A. Jones; Richard D. Fuerle

[57] ABSTRACT

Disclosed is an improvement on a process in which sodium chromate is reacted with sulfuric acid to produce sodium bichromate and sodium sulfate, and the sodium bichromate is reacted with sulfuric acid to produce chromic acid and sodium bisulfate. In the improvement, the sodium sulfate and sodium bisulfate are reacted with hydrogen chloride to produce sulfuric acid, which is recycled, and sodium chloride.

15 Claims, 2 Drawing Sheets

PROCESS FOR MAKING CHROMIC ACID

BACKGROUND OF THE INVENTION

This invention relates to an improved, environmentally preferred, process for making chromic acid. In particular, it relates to an improvement wherein chrome contaminated sodium sulfate or sodium bisulfate produced in a process for making sodium bichromate or chromic acid is reacted with hydrochloric acid to produce sulfuric acid, and the sulfuric acid is recycled back to the process.

Chromic acid and sodium bichromate or sodium chromate are made by roasting chromium-containing ore with soda ash (sodium carbonate) or sodium hydroxide to form sodium chromate. The roasted ore is quenched in water and the soluble sodium chromate dissolves in the water to form "yellow liquor." The sodium chromate is reacted with sulfuric acid or sodium bisulfate to produce sodium bichromate (the "bichromate process"). Upon evaporation, by-product sodium sulfate crystallizes and is filtered off. Because it is contaminated with about 200 to about 1600 ppm of hexavalent chromium, it can be sold only to low value markets such as the pulp and paper industry, and the chromium values in it are lost. Increasingly, environmental considerations limit the sale of sodium sulfate to a maximum chromium contamination of 1000 ppm.

A portion of the sodium bichromate is reacted with sulfuric acid to produce chromic acid, which precipitates and is filtered off for further processing (the "chromic acid process"). The filtrate contains sodium bisulfate, dissolved chromic acid, and excess sulfuric acid. To make use of the acid value of this stream, the sodium bisulfate filtrate is recycled to the sodium bichromate process where it is reacted with sodium chromate. The sodium bisulfate contains about 5 to about 10 wt % chromic acid which is then reconverted into sodium bichromate, a product which is less valuable than chromic acid.

The sodium bichromate produced can be used to make products for leather tanning, chrome plating, and the manufacture of pigments, as well as other uses. Chromic acid crystal or flake is primarily used in the manufacture of wood treating compounds to make the wood rot resistant.

In the chlor-alkali industry, sodium chloride brine is electrolyzed to produce caustic (sodium hydroxide), chlorine, and hydrogen. Projections indicate that in the future there will be an excess of chlorine relative to sodium hydroxide. It is difficult to dispose of or make use of the chlorine that is produced in making caustic without creating an aqueous waste stream which contains large amounts of chloride ions. To reduce the chlorine produced, the production of caustic must either be reduced or other, more expensive, ways of producing caustic must be used that avoid the production of co-product chlorine. While the chlorine can be burned in hydrogen to produce hydrochloric acid, there is also an excess of hydrochloric acid, with future projections indicating that severe excesses of this commodity are also likely to occur.

SUMMARY OF THE INVENTION

In the improvement of this invention, the sodium sulfate and/or sodium bisulfate produced in making chromic acid are reacted with hydrogen chloride, yielding sulfuric acid and sodium chloride, which precipitates in the presence of minor excesses of HCl. The sulfuric acid, after HCl stripping and water removal, can be recycled to the bichromate or chromic acid process.

Very unexpectedly, we have discovered that when the sulfuric acid is concentrated, the chromium contamination in the sulfuric acid precipitates as chromic sulfate, $Cr_2(SO_4)_3$. This is very important because if sulfuric acid is used in the bichromate process that contains more than about 200 ppm trivalent chromium, the sodium sulfate produced becomes very fine and difficult to filter, which slows down production greatly.

It should also be noted that the presence of chlorides in the bichromate process is implicated in sodium sulfate fines generation. Chlorides also act as a reductant to $Cr^{+6}$ ions, producing trivalent chrome in the process liquors and generating nuisance amounts of elemental chlorine, $Cl_2$, in vapor spaces. The sulfuric acid concentration step in this invention effects an almost complete removal of chlorides, as HCl, thus avoiding the chloride induced problems.

In addition, in the chromic acid process the filtrate from which chromic acid is removed contains residual dissolved chromic acid. This filtrate is recycled to the yellow liquor to make use of the sodium bisulfate and sulfuric acid in it. There, the chromic acid in the filtrate is converted into sodium bichromate, which is less valuable than chromic acid. In the process of this invention, however, this filtrate is cooled to precipitate the sodium bisulfate, which is converted into sulfuric acid. The remaining filtrate, containing chromic acid and excess sulfuric acid, is recycled to the chromic acid process, rather than to the bichromate process, so that the chromic acid in the filtrate is not converted into the less valuable sodium bichromate. This represents a substantial savings of chromic acid, and allows the ratio of sodium bichromate required to produce chromic acid to be lowered substantially without creating the need to neutralize excesses of acid unproductively. (If more chromic acid is made, it forces more sodium bisulfate, sulfuric acid, and chromic acid to be returned to the bichromate process. At some point there is so much acid value that chromic acid will begin to precipitate in the sodium bichromate process and leave with the precipitated sodium sulfate. Before this situation is allowed to occur, some of the sodium bisulfate stream will require neutralization, which wastes caustic soda or soda ash.)

DESCRIPTION OF THE INVENTION

Figure 1:
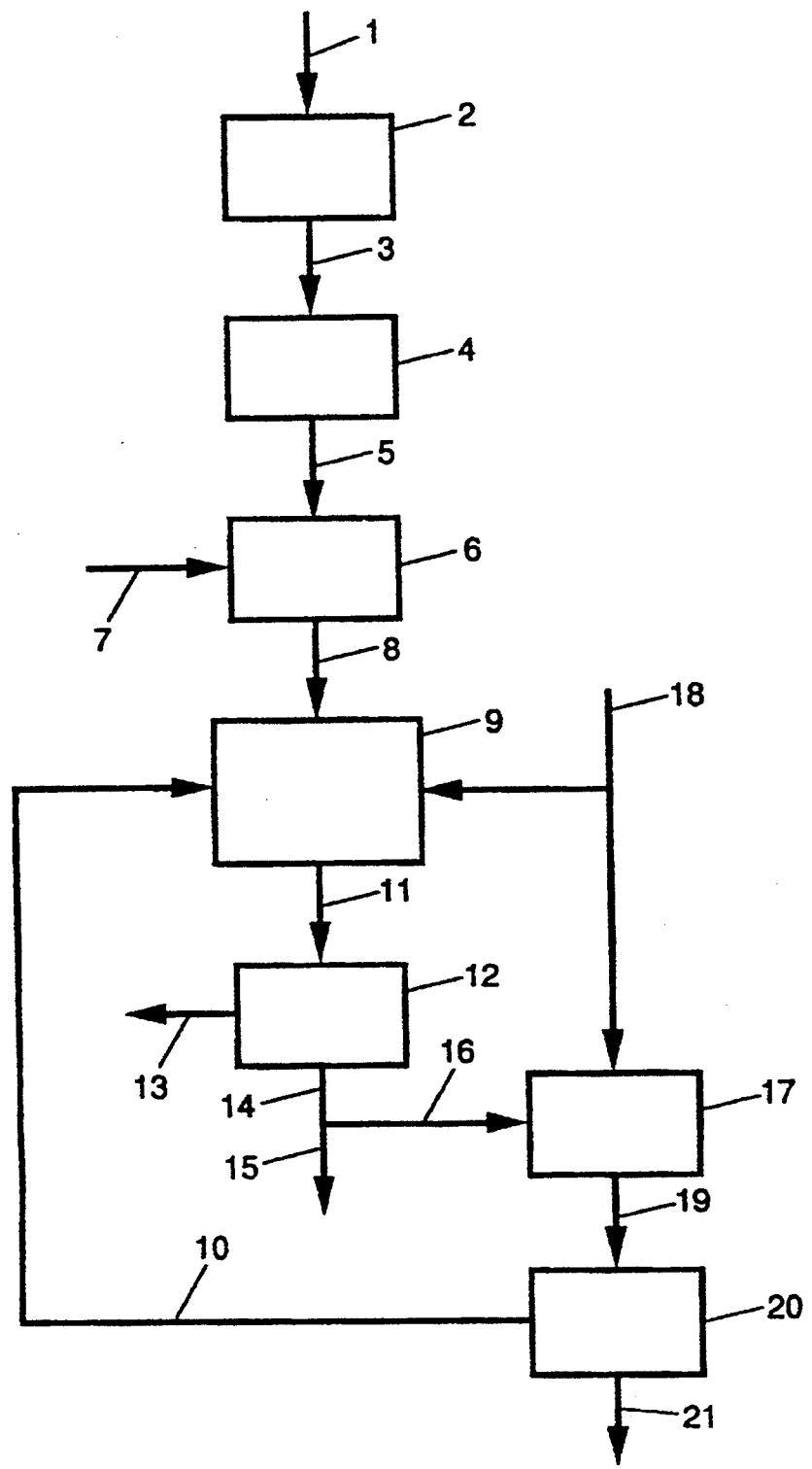
FIG. 1 is a diagram illustrating a conventional process for producing sodium bichromate and chromic acid.

In FIG. 1, chromium-containing ore 1 enters ore treatment facility 2 where it is pulverized and mixed with lime and soda ash. The mixture passes through line 3 to kiln 4 where it is roasted. It then passes through line 5 to quench tank 6 where it is quenched in water from line 7 to produce yellow liquor which passes through line 8 into first reactor 9. In reactor 9 sodium chromate in the yellow liquor is reacted with recycled sodium bisulfate solution from line 10 and water is evaporated to produce a slurry of sodium bichromate liquor and precipitated sodium sulfate. The slurry is passed through line 11 to filter 12 where the sodium sulfate is removed through line 13 and the filtrate of sodium bichromate is taken out through line 14. Some of the sodium bichromate is removed as product through line 15 and the remainder is passed through line 16 to second reactor 17. In reactor 17 the sodium bichromate is reacted with sulfuric acid from line 18, producing a slurry of chromic acid, which precipitates, and sodium bisulfate. The slurry passes through line 19 to filter 20 where the chromic acid is removed through line 21 and the sodium bisulfate solution is recycled to reactor 9 through line 10, as described hereinabove.

Figure 2:
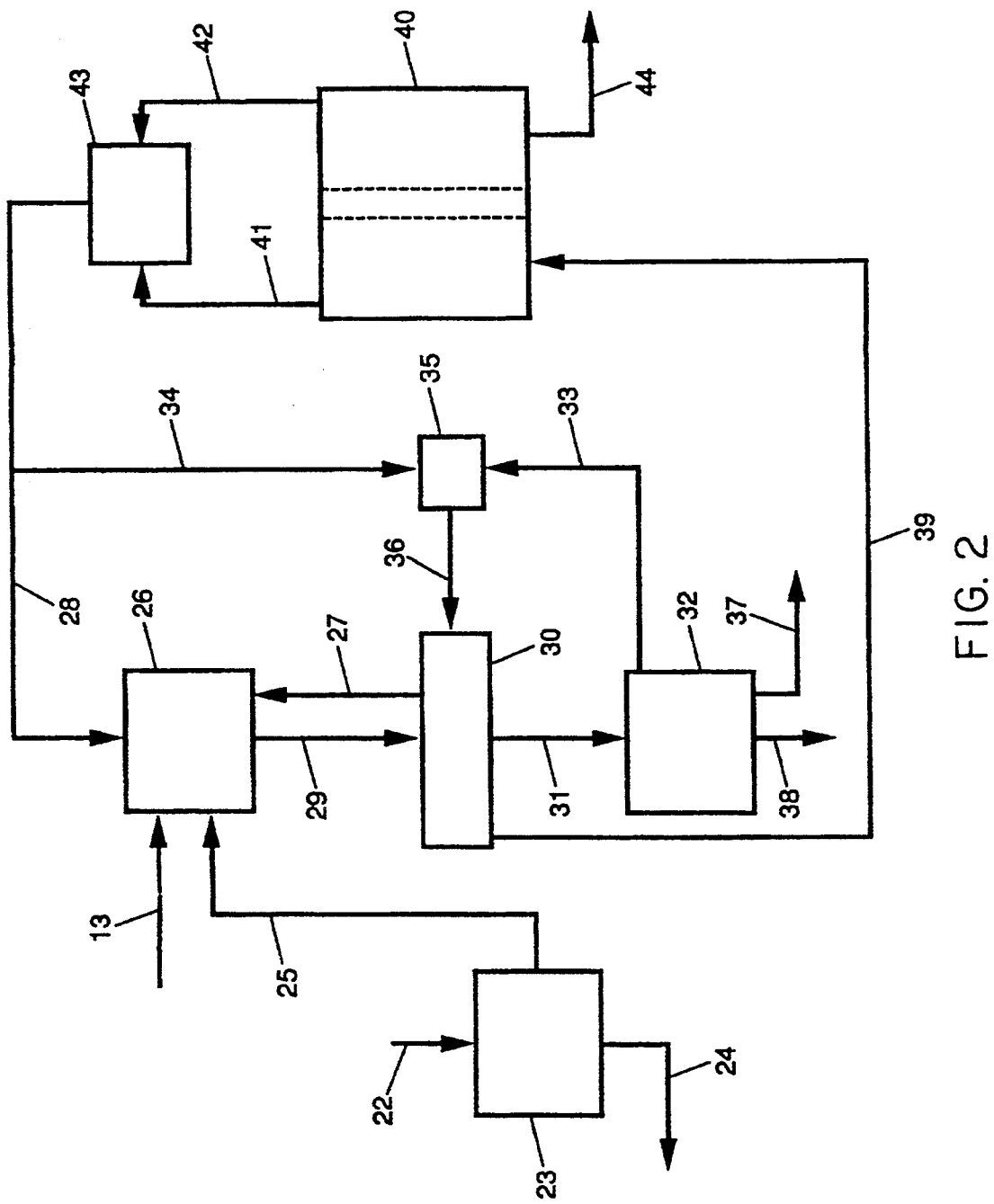
FIG. 2 is a diagram illustrating a certain presently preferred improvement according to this invention on the process shown in FIG. 1.

In FIG. 2, the sodium bisulfate solution in line 10 is instead sent through line 22 to evaporative or cooling crystallizer 23 where sodium bisulfate crystallizes and separates from the dissolved chromic acid and sulfuric acid. The chromic acid and sulfuric acid are returned through line 24 to chromic acid reactor 17 (See FIG. 1). Sodium bisulfate crystal through line 25 and sodium sulfate crystal through line 13 (see also FIG. 1) enter reactor 26. Muriatic acid enters the reactor through line 27, and anhydrous hydrogen chloride is conducted to the reactor through line 28. The mixing causes the formation of sulfuric acid and the crystallization of sodium chloride. The resulting slurry leaves reactor 26 through line 29 and the sodium chloride is separated from the crude sulfuric acid on solids separator 30. The filtrate leaves solids separator 30 through line 31 and enters evaporator 32. Hydrogen chloride and water leave the evaporator through line 33, and are fortified with additional hydrogen chloride which enters through line 34 to mixer tank 35. This fortified acid is conducted through line 36 to the solids separator 30 where it is used to wash residual sulfuric acid and sodium sulfate from the sodium chloride solids. As the concentration of sulfuric acid in evaporator 32 increases, chromic sulfate precipitates. When the sulfuric acid concentration in evaporator 32 becomes suitable for use, the precipitated chromic sulfate is removed through line 37 for return to kiln 4 (see FIG. 1). The sulfuric acid removed in line 38 is pure and may be used for almost any commercial purpose, but is preferably returned to the previously described chromic acid reactor 17 or sodium bichromate reactor 9 or to both. Sodium chloride solids from solids separator 30 are converted into brine and are conducted through line 39 to the anode compartment of electrolytic cell 40. Chlorine is generated at the anode and leaves the cell through line 41. Likewise, hydrogen forms at the cathode and leaves through line 42. The chlorine is then burned in the hydrogen in burner 43 to form hydrogen chloride, which is conducted through lines 28 and 34 for use in the process of converting sodium sulfate and sodium bisulfate into sulfuric acid. A solution of caustic soda (NaOH) leaves electrolytic cell 40 through line 44 for further concentration, if required, and subsequent sale or internal use.

The starting material for the improvement of this invention is the sodium sulfate produced in the process for making chromic acid by reacting sodium chromate with sulfuric acid according to the equation:

and the sodium bisulfate produced in the same process when the sodium bichromate produced in the above reaction is reacted with sulfuric acid according to the equation:

(The $CrO_3$ produced in the above reaction is called "chromic acid" in the industry, but is actually chromic anhydride. Chromic acid, $H_2CrO_4$, is produced when chromic anhydride is added to water.) These reactions preferably are conducted at about room temperature to about 60° C. Both the sodium sulfate and the sodium bisulfate typically contain about 200 to about 1600 ppm hexavalent chromium.

The hydrogen chloride can be obtained from a variety of industrial processes but it is most advantageously obtained by burning the chlorine and hydrogen gases produced in a chlor-alkali plant since the sodium chloride produced by the process of this invention can be used for chlor-alkali production. The hydrogen chloride can be hydrogen chloride gas or it can be in hydrochloric acid (muriatic acid).

In the improvement of this invention, sodium sulfate or sodium bisulfate which is contaminated with hexavalent chrome is reacted with hydrochloric acid to produce sodium chloride and sulfuric acid. This reaction is preferably conducted at about room temperature to about 60° C.:

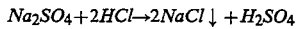

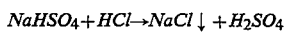

In order to drive the reaction to the right and maximize the precipitation of sodium chloride, it is preferable to use about 2 to about 10 mole % excess hydrogen chloride. Also, in order to produce sulfuric acid that is as concentrated as possible, it is preferable to use a mixture of concentrated muriatic acid (30 to 37 wt %) and hydrogen chloride gas in a molar ratio of about 1 to about 4 (based on the HCl content of the muriatic acid). The sulfuric acid that is produced typically has a concentration of about 33 to about 63 wt %. The sulfuric acid is heated to drive off the residual hydrogen chloride at a temperature of about 110° C. for a few minutes. It is then further heated to drive off water and increase its concentration to commercially useful strengths. As the concentration of sulfuric acid increases, chromic sulfate, $Cr_2(SO_4)_3$, precipitates. The chromic sulfate can be returned to the kiln where it is roasted to make additional yellow liquor.

After the precipitated sodium chloride is filtered off, it is preferably washed with fresh muriatic acid and the wash liquor is used in the reaction with the sodium sulfate or sodium bisulfate. The sodium chloride produced is very pure and contains only chromium and sulfate ions in any significant amount, and these ions are easily removed. The sodium chloride is preferably used to form brine, which is electrolyzed in an electrolytic cell to produce sodium hydroxide, chlorine, and hydrogen.

The following examples further illustrate this invention.

EXAMPLE 1

Into 137 g of 32% muriatic acid, 142 g of sodium sulfate (salt cake) from a commercial chromic acid process, containing about 650 ppm Cr, was added rapidly with constant mixing. The mixture was allowed to react for one hour at 22° C. and was then filtered; 152 g of green filtrate was recovered.

The filtrate was heated to 60° C. and gaseous HCl was introduced for one hour with constant stirring. About 40 g of HCl were absorbed and the mixture was immediately filtered to yield 130 g of filtrate of the following composition:

| wt % Na | 0.8 | S/Na Mole Ratio | ~12 |
|---|---|---|---|
| wt % Cl | 10.4 | wt % as $H_2SO_4$ | ~42 |

This experiment shows that the sodium sulfate was converted into sulfuric acid.

EXAMPLE 2

Salt cake, as in Example 1, in the amount of 213 g, was rapidly added with vigorous mixing to a charge of 200 g 37 wt % HCl and 150 g of the first filtrate from Example 1. A slow HCl (gas) addition to the solution, with moderate mixing, over a 5-hour period at room temperature showed an HCl gain of 74 g. The light green slurry was filtered through a porous glass filter separating 325 g of green filtrate from 311 g of cake. The cake was slurried with 75 cc of 37 wt % HCl and then washed with 3 to 50 cc portions of 37 wt % HCl yielding 281 g of washed cake with 3.02 wt % $SO_4^=$ by Hach analysis. The filtrate analysis revealed the following:

| Specific Gravity | 1.42 g/cc | S/Na Mole Ratio | 28 |
|---|---|---|---|
| wt % Na | 0.37 | wt % as $H_2SO_4$ | 49 |
| wt % Cl | 9.0 | | |
| wt % S | 14.6 | | |

EXAMPLE 3

A slurry of 142 g of salt cake, as in Example 1, and 109 g distilled water were mechanically mixed at 60° C. The addition of gaseous HCl over three hours with moderate mixing at 60° C. achieved a total weight gain of 84.2 g to the system. The resultant viscous green slurry was filtered through a porous glass filter producing 126 g green filtrate and 199 g greyish-white cake. Washing the cake with 200 cc of acetone yielded 130 g of powdery white cake. Analysis of the filtrate showed 0.7 wt % Na, 10.7 wt % Cl, and 13.5 wt % S with a S/Na mole ratio of 14.

EXAMPLE 4

Weak acid liquor from the metathesis reaction of salt cake and HCl containing 32 wt % $H_2SO_4$, 17 wt % HCl, 0.2 wt % Na, and about 650 ppm Cr was concentrated at atmospheric pressure. Samples were periodically removed to correlate boiling point with acid concentration and establish when $Cr_2(SO_4)_3$ precipitated.

| Pot Temp. °C. | Sample Appearance | wt % $H_2SO_4$ | Cr, ppm | Cl, ppm |
|---|---|---|---|---|
| 182 | green, clear | 73 | ~650 | |
| 225 | " | 84 | " | |
| 265 | " | 90 | " | |
| 300 | " | 94 | " | |
| 315 Reflux | bright yellow (filtered) | 97 | ~15 | |

This example shows that chromium can be recovered from the sulfuric acid as a precipitate by concentrating the sulfuric acid. Likewise, it demonstrates that chlorides are effectively removed during the acid concentration step.

EXAMPLE 5

Salt cake, as in Example 1, 40 g, was dissolved in 100 g of 40 wt % sulfuric acid solution at room temperature. The resultant solution was saturated with gaseous hydrogen chloride at 25° C. The reaction mixture contained 56 wt % solids by volume.

Filtration produced 30.4 g of solid sodium chloride and 115.3 g of green filtrate. The compositions were as follows:

| filtrate before concentration step: | 0.34 wt % Na |
|---|---|
| | 12.6 wt % Cl |
| | 14.6 wt % S |
| | (44.7 wt % $H_2SO_4$) |
| | ~30 S/Na Mole Ratio |
| solid: | 0 wt % $SO_4^=$ by Hach Test |

We claim:

1. In a process wherein sodium chromate is reacted with aqueous sulfuric acid to produce an aqueous solution of sodium bichromate and solid sodium sulfate contaminated with hexavalent chromium, and said solid sodium sulfate is separated from said solution, the improvement comprising (A) reacting said solid sodium sulfate with an aqueous solution of hydrogen chloride to produce solid sodium chloride and an aqueous solution of sulfuric acid which consists essentially of sulfuric acid, hydrogen chloride, and hexavalent chromium;

(B) separating said solid sodium chloride from said aqueous solution of sulfuric acid;

(C) heating said aqueous solution of sulfuric acid to a temperature sufficient to evaporate hydrogen chloride therefrom; and (D) further heating said aqueous solution of sulfuric acid to evaporate water and precipitate chromic sulfate, $Cr_2(SO_4)_3$.

2. An improvement according to claim 1 wherein said aqueous solution of sulfuric acid is heated to about 110° C. in step (C).

3. An improvement according to claim 1 wherein said aqueous solution of sulfuric acid is recycled back to said process after step (D).

4. An improvement according to claim 1 wherein the amount of said hydrogen chloride used in step (A) is about 2 to about 10 mole % in excess of stoichiometric.

5. An improvement according to claim 1 wherein said hydrogen chloride in step (A) is a mixture of concentrated muriatic acid and hydrogen chloride gas in a mole ratio of about 1 to about 4.

6. An improvement according to claim 1 wherein said reaction in step (A) is at a temperature between room temperature and 60° C.

7. An improvement according to claim 1 including the step of electrolyzing said sodium chloride to make sodium hydroxide, hydrogen, and chlorine, and burning said chlorine in said hydrogen to make said hydrogen chloride.

8. In a process wherein sodium bichromate is reacted with aqueous sulfuric acid to produce chromic acid, which precipitates, and a solution of sodium bisulfate and sulfuric acid contaminated with hexavalent chromium, and said chromic acid precipitate is separated from said solution, the improvement comprising (A) crystallizing said sodium bisulfate and separating solid sodium bisulfate from said solution;

(B) returning said solution from step (A) to said process;

(C) reacting said solid sodium bisulfate with an aqueous solution of hydrogen chloride to produce sodium chloride, which precipitates, and an aqueous solution of sulfuric acid consisting essentially of sulfuric acid, hydrogen chloride, and hexavalent chromium;

(D) separating said sodium chloride precipitate from said aqueous solution of sulfuric acid;

(E) heating said aqueous solution of sulfuric acid to a temperature sufficient to evaporate hydrogen chloride therefrom; and (F) further heating said aqueous solution of sulfuric acid to evaporate water and precipitate chromic sulfate, $Cr_2(SO_4)_3$.

9. An improvement according to claim 8 wherein said sulfuric acid is heated in step (E) to a temperature of about 110° C.

10. An improvement according to claim 8 wherein said aqueous solution of sulfuric acid is recycled back to said process after step (F).

11. An improvement according to claim 8 wherein the amount of said hydrogen chloride used in step (C) is about 2 to about 10 mole % in excess of stoichiometric.

12. An improvement according to claim 8 wherein said hydrogen chloride in step (C) is a mixture of concentrated muriatic acid and hydrogen chloride gas in a mole ratio of about 1 to about 4.

13. An improvement according to claim 8 wherein said reaction in step (C) is at a temperature between room temperature and 60° C.

14. An improvement according to claim 8 including the step of electrolyzing said sodium chloride to make sodium hydroxide, chlorine, and hydrogen and burning said chlorine in said hydrogen to make said hydrogen chloride.

15. In a first process wherein sodium chromate is reacted with aqueous sulfuric acid to produce an aqueous solution of sodium bichromate and solid sodium sulfate contaminated with hexavalent chromium, and said solid sodium sulfate is separated from said solution, and in a second process wherein said sodium bichromate is reacted with aqueous sulfuric acid to produce chromic acid, which precipitates, and an aqueous solution of sodium bisulfate contaminated with hexavalent chromium, the improvement comprising (A) crystallizing said sodium bisulfate and separating solid sodium bisulfate from said aqueous solution thereof;

(B) returning said aqueous solution from step (A) to said second process;

(C) reacting said solid sodium sulfate and said solid sodium bisulfate with an aqueous solution of hydrogen chloride to produce sodium chloride, which precipitates, and an aqueous solution of sulfuric acid which contains hydrogen chloride and hexavalent chromium;

(D) separating said sodium chloride precipitate from said aqueous solution of sulfuric acid;

(E) heating said aqueous solution of sulfuric acid to a temperature sufficient to evaporate hydrogen chloride therefrom; and (F) further heating said aqueous solution of sulfuric acid to evaporate water and precipitate chromic sulfate, $Cr_2(SO_4)_3$.

* * * * *